Nov. 13, 1934.     R. F. DIRKES ET AL     1,980,324
WEB CONTROLLING MECHANISM FOR PAGE PROJECTORS
Filed Nov. 10, 1931     2 Sheets-Sheet 1

INVENTOR-
R. F. DIRKES
BY R. WENTWORTH
Eugene C. Brown
ATTORNEY-

Nov. 13, 1934.   R. F. DIRKES ET AL   1,980,324
WEB CONTROLLING MECHANISM FOR PAGE PROJECTORS
Filed Nov. 10, 1931   2 Sheets-Sheet 2

INVENTOR-
R. F. DIRKES
BY R. WENTWORTH
ATTORNEY-

Patented Nov. 13, 1934

1,980,324

UNITED STATES PATENT OFFICE 1,980,324

WEB CONTROLLING MECHANISM FOR PAGE PROJECTORS

Robert F. Dirkes, Jamaica, N. Y., and Rollins Wentworth, Montclair, N. J., assignors to The Western Union Telegraph Company, New York, N. Y., a corporation of New York Application November 10, 1931, Serial No. 574,198

19 Claims. (Cl. 178—24)

This invention relates to a page projector for a telegraph printer and more particularly to a web controlling mechanism for such projectors.

In a copending application of Long and Wheeler, Ser. No. 517,353, filed February 20, 1931, and entitled "Page projector for recorders" there is shown a type wheel printer and associated projecting apparatus with which the present invention may be used. The invention may also be used with type bar printers such as shown in copending application of G. R. Benjamin and J. W. Long, Ser. No. 523,372, filed March 17, 1931.

Briefly such prior applications relate to telegraph page projectors in which the page is held stationary during the printing of a line, the printing being effected either by a type wheel moving transversely across the paper or by type bars mounted in a basket movable across the paper. At the completion of the printing of each line the paper moves upwardly to bring the printed line into the field of the projector. The projected image of the page, therefore, moves upwardly across the screen in a succession of jumps or steps of one line space each.

This type of telegraph projector is particularly adaptable for use in public places, such as hotels, restaurants, show windows, etc., for displaying in enlarged characters upon a suitable screen, current news items transmitted telegraphically to the projecting apparatus. The individual news items or paragraphs, in such news systems, are usually short and can be conveniently displayed in their entirety upon a screen of moderate dimensions at one time.

One of the objects of the present invention is to provide a web controlling apparatus whereby a complete news item or paragraph, or a plural number of lines thereof, may be printed during the projection of the preceding item and advanced into the field of the projector by a continuous or single movement.

Another object is to provide a page projecting apparatus of the above nature in which the length of the item or the number of lines advanced into the field of the projector at any one time may be varied.

A further object is to enable each item or paragraph to be held stationary on the screen during the entire period of its projection, that is, to advance the printed page into the field of the projector item by item as distinguished from line by line.

A still further object is to provide a fade-out of one item during the feeding of the succeeding item on the screen whereby the first item will dissolve into the succeeding one.

Other objects and advantages of the invention will hereinafter appear.

In accordance with the particular embodiment of our invention shown in the present application we provide a storage loop between the printer and the field of the projector whereby the page as it is printed and ejected from the printer may accumulate until the printing of the entire item has been completed. Tension means is provided in the loop to maintain the web taut across the field of the projector and for withdrawing the web from the printer as each line is completed. At any time during the printing, but preferably at the end of an item or paragraph, a take-up mechanism is operated in response to signals transmitted over the line to automatically advance the accumulated printed matter into the field of the projector. As the web between the printer and projector becomes taut, that is, when all the accumulated printed portion of the tape has moved into projecting position, the operation of the take-up mechanism is interrupted and a new supply of tape permitted to form between the printer and the projector.

Preferably during the time of change from one printed item to the next, the light source of the projector is extinguished to give a fade-out or dissolving effect of one item into the succeeding one.

In order that the invention may be more fully understood reference will be had to the accompanying drawings in which.

Figure 1:
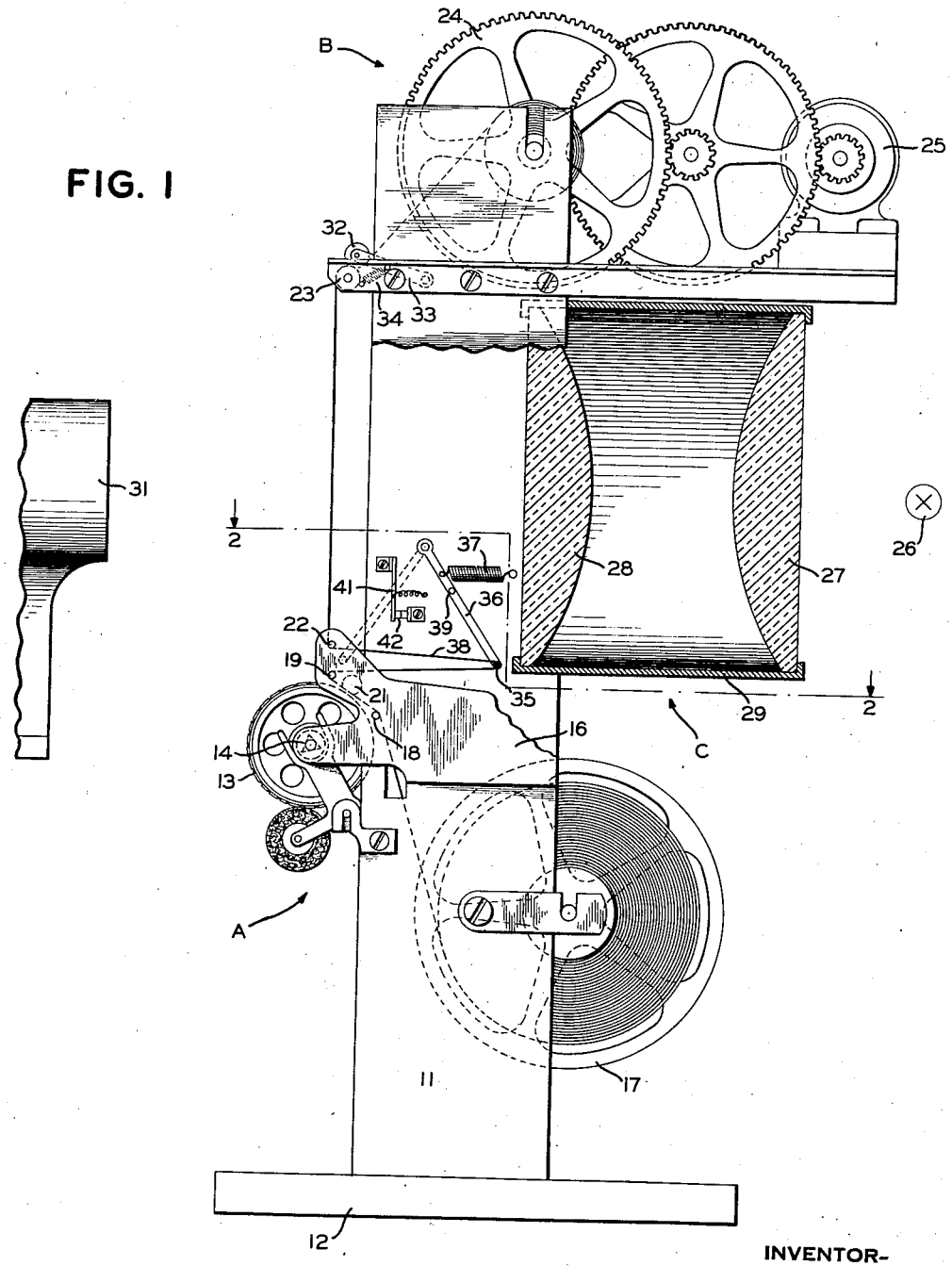
Figure 1 is a side elevation, partly in section, showing the principal parts of a telegraph printing and projecting apparatus with our invention applied thereto.
Figure 2:
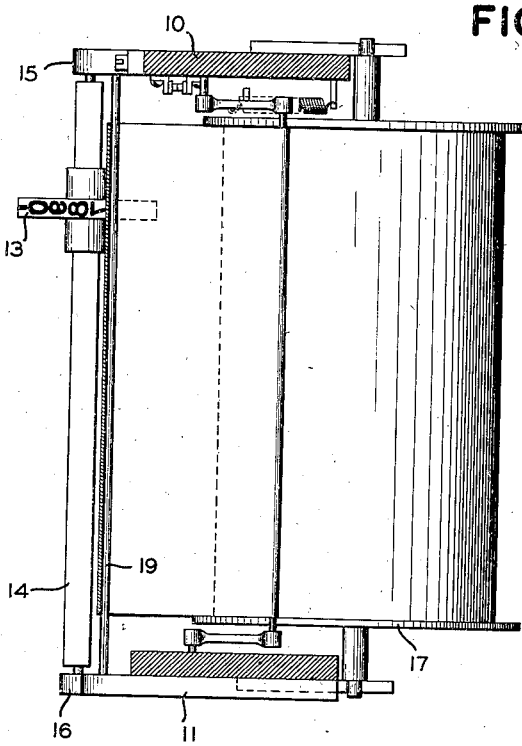
Figure 2 is a sectional view on the line 2—2 of Figure 1.

Referring first to Figure 1, we have shown a page printing telegraph projector comprising a printing mechanism A, a paper take-up mechanism B spaced therefrom, and a projecting system C interposed between the printing mechanism and the take-up mechanism. The printer shown is a page ticker of the Burry type such as disclosed in United States Patent No. 689,693, granted August 20, 1931, although it is to be understood that the invention is not limited to recorders of this type but may be employed with other forms of recorders, such as type bar or type wheel printers operating on a permutation code.

The complete Burry page printer is not shown since it is well known in the art. The operating parts of the printer and projector are arranged between a pair of side plates or frames 10 and 11 which are mounted upon a suitable base 12. The type by which the printing is done is arranged on the periphery of a type wheel 13 slidably mounted upon a triangular shaft 14, journaled in brackets 15 and 16 carried by the side plates 10 and 11. The shaft is rotated to bring any desired character to the printing point and the type wheel is moved along the shaft transversely of the web to effect the letter spacing.

The medium upon which the printing is done is in the form of a continuous strip or tape, of transparent material, such as cellophane, wound on to a reel 17. It passes upwardly from the reel over a roller 18 and around a roller 19, both of which are journaled at the opposite sides of the machine. The tape passes between the type wheel 14 and the printing bar or platen 21 and continues upwardly over the roller 22 and thence through the field of the projector and over a roller 23. From the roller 23 the web passes to a take-up reel 24 driven by an electric motor 25 through suitable gearing as shown.

The projecting system comprises a suitable light source 26 such as a concentrated filament incandescent lamp, a condensing lens series consisting of a pair of plano-convex lenses 27 and 28 contained within a lens holder 29. A water cell may be provided between the lenses if desired. The lenses are substantially co-extensive with the area of the web to be projected and serve to direct the light uniformly over the surface of the web. Obviously, in place of transmitting the light through the web the printing may be projected by reflection from the web.

Located at the opposite side of the web from the condensing lens system and at the proper focal length therefrom is an objective lens series 31 for projecting the image upon a suitable screen, not shown. The printing and projecting apparatus may be disposed in the base of a cabinet and the image reflected by suitable mirrors upon a screen forming a front wall of the cabinet, as shown in the aforesaid application of Long and Wheeler, or if desired the image may be projected upon a screen disposed opposite to the projecting lens system.

It is to be understood that the motor 25 is normally idle, the tape being held against backward movement by a pressure roller 32 which presses the tape against the rear side of the roller 23. The roller 32 is mounted upon the ends of arms 33 pivoted to the side plates 10 and 11 and is urged towards the roller 23 by springs 34. When the motor is operated to apply tension to the tape the roller 32 is lifted free of the roller 23 by the pull of the tape, permitting the tape to wind freely on the reel 24.

Intermediate the small rollers 19 and 22 at the base of the projector we permit a loop of tape to form as the printing occurs until a complete item or paragraph has been printed. For this purpose a rod or roller 35 is mounted upon the free ends of a pair of levers 36 pivoted to the side plates 10 and 11 and urged up rearwardly by coil springs 37 so as to maintain tension on the loop. The web is thus held taut across the field of the projector and also tension is applied to the tape passing across the type wheel, so that as each line is completed and the reel 17 released to feed out a predetermined amount of tape, it will be drawn past the type wheel and platen by the roller 35 and permitted to accumulate within the loop 38.

Figure 3:
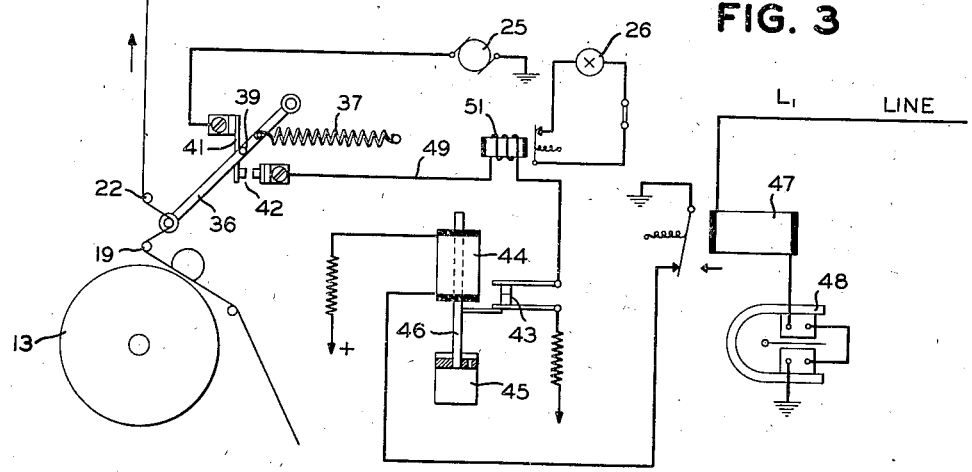
Figure 3 is a circuit diagram showing the control of the paper take-up mechanism and light source in response to line signals.

A pin 39 is carried by one of the levers 36 and serves when the lever is fully advanced, as shown in Figure 3, to engage a contact arm 41 to open a set of contacts 42. The contacts 42 are included in the circuit of the winding motor 25 as also is a set of line controlled contacts 43. The contacts 43 are normally open and are adapted to be closed by a solenoid 44, having a dash pot 45 attached to its plunger 46. One terminal of the winding of solenoid 44 is connected to positive battery and the opposite terminal is connected to the back contact of a neutral relay 47, arranged serially in the line circuit L. The tongue of relay 47 is grounded. A polarized escapement relay 48 also is disposed in the line circuit and serves to control the step-by-step movement of the type wheel into printing position in response to a variable number of current alternations transmitted over the line. After the type wheel has been positioned by the stepping impulses, a prolonged impulse or steady current condition is impressed on the line L, which serves to operate a press magnet (not shown) to effect printing from the type wheel. The press magnet is sufficiently sluggish so as not to respond to the stepping impulses but only to the prolonged or press impulse.

The complete transmitting and receiving equipment of the Burry page ticker is shown in U. S. patent of Long and Steeneck, No. 1,881,757 granted Oct. 11, 1932, and entitled Telegraph transmitting apparatus.

In the system of the Long and Steeneck application the dashpot solenoid 44 is actuated whenever desired by transmitting a prolonged series of current alternations, continuing over an interval considerably longer than that required for positioning the type wheel.

The line relay 47 while responding to the prolonged or press impulse is of such a sluggish nature as not to respond to current alternations of the signaling frequency and consequently during the reception of the step-by-step or escapement impulses it rests upon its back contact, applying ground to the winding of the solenoid 44. This solenoid is adjusted by means of the dashpot 45, so that it does not act within the time consumed in the transmission of escapement impulses incident to the normal printing operation, which require only a fraction of a second, but upon the continued application of current alternations to the line for a longer period, it acts to close the contacts 43.

The transmission of such prolonged series of current alternations for effecting the closure of contacts 43 occurs, of course, only after an accumulation or loop of printed tape has formed between the rollers 19 and 22, at which time the lever 36 is moved to the rear by spring 37, as shown in Figure 1, permitting the contacts 42 to remain closed. A circuit may then be traced from battery through the contacts 43, conductor 49, contacts 42 and motor 25 to ground. The motor 25 is thereby energized and serves to wind the printed web onto the reel 24, drawing the portion thereof contained in the loop 38, upwardly into the field of the projector. This movement continues until the loop is substantially eliminated, as shown in Figure 3, at which time the pin 39 on the arm 36 engages the contact arm 41, opening contacts 42 and interrupting the motor circuit. The last printed item is thus moved into the field of the projector and is held stationary therein by the tension applied by the lever 36 and spring 37, during the printing of the next item or group of lines.

As soon as the prolonged press inpulse of the first character of the succeeding paragraph is received, the relay 47 is drawn to its front contact, removing ground from the solenoid 44 and allowing the contacts 43 to open. As soon as the first line of the next paragraph has been completed the paper advances past the platen, entering the loop 38 and permitting the lever 36 to move backward so as to close contacts 42 and prepare the motor circuit for the succeeding operation of the dashpot relay 44.

Included in the motor circuit is the winding of a relay 51 which controls the operation of the projection lamp 26. The circuit of the lamp 26 is completed through the tongue and back contact of the relay and is normally closed. However, during the period of changing from one item to the other, that is, when the circuit to the winding motor is completed, the relay 51 picks up, opening the lamp circuit and extinguishing the lamp during the movement of the web into the field of the projector. The lamp is re-energized following the transfer period. A fade-out effect is thus produced in which one item has the appearance of dissolving into the succeeding one.

Obviously local keyboard transmitting means may be employed instead of signals received from a distant station. In such case the feeding up of the accumulated web into the projection field need not be controlled by a long continued series of current alternation, it being only necessary to close contacts 43 manually or by a separate key on the transmitting keyboard.

It is obvious, of course, that various changes and modifications may be made in the details of construction shown and described, without departing from the invention, and, therefore, we do not desire to be limited to such details, except in accordance with the appended claims.

What we claim is:

1. In combination a line circuit, a telegraph printer operable by signals transmitted over said line circuit, means for advancing a printed web from the printer, means for forming a loop in said advanced portion of the web and means responsive to line signals and independent of the size of said loop for causing a diminution of said loop.

2. In combination a line circuit, a printer responsive to line signals for printing successive items of information, each item comprising a plurality of lines, means for maintaining one item of information in a predetermined stationary position during the printing of the succeeding item and means for advancing the succeeding item into said position in a continuous movement.

3. In combination a line circuit, a printer responsive to line signals for printing successive items of information, each item comprising a plurality of lines, means for maintaining one item of information in a display position during the printing of the succeeding item, means for advancing the succeeding item into said display position in a continuous movement and means for preventing display of either item during the transfer from one item to the succeeding one.

4. In combination a line circuit, a printer responsive to line signals for printing successive lines on a web, means for permitting said printed web to accumulate between the printer and a predetermined display position and means responsive to line signals for advancing said accumulated portion of the web into said display position.

5. In combination a line circuit, a printer responsive to line signals for printing successive lines on a web, means permitting a plurality of printed lines to accumulate between the printer and a predetermined display position and means for advancing said accumlated portion of the web into said display position.

6. In combination a printer responsive to telegraph signals for printing successive lines on a web, means for maintaining one portion of said web in a stationary position while printing a plurality of lines on a succeeding portion thereof and means for advancing said succeeding portion of the web into said position in a continuous movement.

7. In combination a printer responsive to telegraph signals for printing successive lines on a web, means for maintaining one portion of said web in a stationary position while printing a plurality of lines on a succeeding portion thereof and means responsive to line signals for advancing said succeeding portion of the web into said position.

8. In combination a printer responsive to telegraph signals for printing successive lines on a web, means for permitting a plurality of printed lines to accumulate between the printer and a predetermined display position and means operable at will for advancing said accumulated portion of the web into said display position.

9. In combination a printer responsive to telegraph signals for printing successive lines on a web, means for maintaining one portion of said web stationary in a predetermined display position while printing a plurality of lines on a succeeding portion thereof, a pulling device for drawing said web through said display position, means operable at will for starting the operation of said pulling device and means controlled by the web for stopping the operation of said pulling device.

10. In combination a printer responsive to telegraph signals for printing successive lines on a web, means for maintaining one portion of said web stationary in a predetermined display position while printing a plurality of lines on a succeeding portion thereof, a pulling device for drawing said web through said display position, means operable by telegraph signals for starting the operation of said pulling device and means controlled by the web for stopping the operation of said pulling device after said accumulation has been reduced to a predetermined minimum.

11. In combination a printer responsive to telegraph signals for printing successive lines on a web, means for permitting a plurality of printed lines to accumulate between the printer and a predetermined display position, a pulling device for drawing said web through said display position, means operable at will for starting the operation of said pulling device and means for stopping the operation thereof after said accumulation has been reduced to a predetermined minimum.

12. In combination a page printer, means for printing a succession of lines on a web, means permitting said printed web to accumulate between the printer and a predetermined display position, means for moving said accumulated web into said display position, a light source for illuminating said web and means for interrupting said light source during the movement of said web.

13. In combination a page printer, means for printing a succession of lines on a web, means permitting said printed web to accumulate between the printer and a stationary display position, means for moving said accumulated web into said display position and means for interrupting the display of said printed web during the movement thereof.

14. In combination a line circuit, a telegraph printer responsive to signals transmitted over said line, means for advancing a printed web from said printer, means for forming a loop in the advanced portion of said web, a pulling device for the web normally inactive during active signaling periods, means controlled over said line circuit for starting the operation of said pulling device and means controlled by said web for stopping the operation of said pulling device.

15. In combination a line circuit, a telegraph printer responsive to signals transmitted over said line, means for advancing a printed tape from said printer, means for accumulating said tape between the printer and a predetermined display position, means controlled by line signals and independent of the size of said loop for starting the movement of said tape past said position and means controlled by said tape for stopping said movement when the accumulation has been reduced to a predetermined amount.

16. In combination a line circuit, a telegraph printer responsive to signals transmitted over said line, means for advancing a printed tape from said printer, means for forming a loop in said tape, a pulling device for the tape, means controlled by line signals and independent of the size of said loop for starting the operation of said pulling device and means for stopping the operation of said pulling device when said loop is reduced to a predetermined size.

17. In combination, a printer for printing successive items of information, each item comprising a plurality of lines, means for maintaining one item of information in a predetermined stationary position during the printing of a succeeding item and means for advancing the succeeding item into said position in a continuous movement.

18. Display apparatus comprising a printer for printing successive items of information, each item comprising a plurality of lines, a source of signals for operating the printer, means for maintaining one item of information in display position during the printing of the succeeding item and means for advancing the succeeding item into display position at the will of the transmitting operator.

19. Display apparatus comprising a printer for printing successive items of information, each item comprising a plurality of lines, a source of signals for operating the printer, means for maintaining one item of information in display position during the printing of the succeeding item, means for advancing the succeeding item into display position at the will of the transmitting operator and means for preventing display of either of said items during movement of the succeeding item into display position.

ROBERT F. DIRKES.
ROLLINS WENTWORTH.